United States Patent
Wu

(10) Patent No.: US 6,938,141 B2
(45) Date of Patent: Aug. 30, 2005

(54) CONTROL CHIP FOR ACCELERATING MEMORY ACCESS AND METHOD OF OPERATING THE SAME

(75) Inventor: Sheng-Chung Wu, Taipei Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 403 days.

(21) Appl. No.: 10/064,206

(22) Filed: Jun. 21, 2002

(65) Prior Publication Data

US 2003/0167384 A1 Sep. 4, 2003

(30) Foreign Application Priority Data

Mar. 1, 2002 (TW) ........................................ 91103731 A

(51) Int. Cl.[7] .............................................. G06F 12/00

(52) U.S. Cl. ....................................... 711/167; 365/193

(58) Field of Search ........................... 711/167; 365/193

(56) References Cited

U.S. PATENT DOCUMENTS 5,784,700 A * 7/1998 Chen et al. .................. 711/172

* cited by examiner

Primary Examiner—Reginald G. Bragdon
(74) Attorney, Agent, or Firm—Jianq Chyun IP office

(57) ABSTRACT

A control chip for accelerating the memory access and a method of operating the same is disclosed. The disclosed control chip receives a first address strobe (ADS) signal, a request signal, and an address bus signal from the CPU. A second ADS signal will be promptly issued if the selection phase of the request signal is either a memory read signal or a memory write signal and the address phase of the address bus signal indicates an effective memory address. Thereafter the second ADS signal is converted to a third ADS signal referring to the memory clocks. A memory control signal will be issued if no zero-length signal is suggested in length phase of the request signal and in the byte enable phase of the address bus signal. Computer system performances will be significantly upgraded since the third ADS signal is issued one cycle advanced than conventional approaches.

22 Claims, 4 Drawing Sheets

CONTROL CHIP FOR ACCELERATING MEMORY ACCESS AND METHOD OF OPERATING THE SAME

CROSS REFERENCE TO RELATED APPLICATIONS

This application claims the priority benefit of Taiwan application serial no. 91103731, filed Mar. 1, 2002.

BACKGROUND OF INVENTION

1. Field of Invention

The present invention generally relates to a control chip, and more particularly to a control chip for accelerating memory read-write operations and a method of operating the same.

2. Description of Related Art

Although a control chip is still used to control access to memory data, the speeds of data processing and calculation in current Central Processing Units (CPUs) are accelerating rapidly. Obviously, the performance and efficiency of the whole computer system can be further enhanced if delays caused by the control chip can be effectively minimized.

FIG. 1 shows a schematic diagram illustrative of the connection between the conventional control chip (10) and the CPU (12), wherein the control chip (10) in FIG. 1 encompasses a microprocessor interface (102), a signal conversion circuit (108), and a memory controller (110). A conventional microprocessor interface (102) usually includes a decoder (104) and an AND gate (106), and receives a first address strobe (ADS) signal, a request signal (HREQ[4:0]), and an address bus signal (HA[31:3]) from the CPU (12) by referring to a CPU clock (HCLK). Thereafter, the microprocessor interface (102) performs a decoding operation on the first address strobe (ADS) signal, the request signal (HREQ[4:0]), and the address bus signal (HA[31:3]) via the decoder (104) in the microprocessor interface (102). The decoding results of the first address strobe (ADS) signal, the request signal (HREQ[4:0]), and the address bus signal (HA[31:3]) (determining whether the memory cycle is valid or not will be described later) are fed into the AND gate (106) to determine the state of the second ADS signal. The second ADS signal is a command strobe signal referring to the HCLK that is then directed to the signal conversion circuit (108), which is coupled to the microprocessor interface (102). After the signal conversion circuit (108) receives the second ADS signal, it then converts the second ADS signal referring to the HCLK into a third ADS signal that refers to the memory clocks (DCLK). The third ADS signal is then fed into the memory controller (110), which is coupled to the signal conversion circuit (108), for deriving a memory control signal that refers to the DCLK and meets the memory specifications. The memory control signal is subsequently sent to the memory to control the memory access operations.

Since the CPU reference frequency is different from the memory reference frequency (for example, they are 100 and 133 MHz respectively), the second ADS signal has to be converted via the signal conversion circuit (108) to generate the third ADS signal referring to the DCLK to perform the necessary memory access operations. However, since the signal conversion circuit (108) usually takes a long time to perform the conversion operations, generating the third ADS signal sometimes results in a longer signal delay and affects the following memory access operations.

The request signal (HREQ[4:0]) output from the CPU (12), mentioned above, includes two phases; wherein Phase I is called the "selection phase" and Phase II is called the "length phase". The selection phase is used to determine the transmission type of the HREQ[4:0] signal, while the length phase is used to indicate the length of the memory being accessed. The address bus signal (HA[31:3] signal) encompasses two phases; wherein Phase I is called the "address phase" and Phase II is called the "byte enable phase". The address phase is used to specify the address of the memory location, the byte enable phase is used to indicate the data type (including the byte data, word data, double word data or four word data (or, quad word)) that is used for current memory access operations. The conventional memory cycle cannot start until the signal contents in Phases I and II of both the HREQ[4:0] and HA[31:3] signals are manipulated. For example, if an effective memory cycle is to be actuated, it should satisfy the following requirements. Firstly, during Phase I signals, the request selection phase in the HREQ [4:0] signal should be either a memory read signal or a memory write signal, and the address phase in the HA[31:3] signal indicates an effective memory range (i.e. a correct memory access range is indicated). Secondly, a Zero-length (Zlen) signal is not suggested in Phases II of HREQ[4:0] and HA[31:3]. The definition of Zlen signal is illustrated as follows. Firstly, the memory length indicated by the length phase in the HREQ[4:0] signal is "quad word" (therefore, the Phase II of the HREQ[4:0] will contain a "00" signal), and simultaneous all bytes of the byte enable phase in the HA[31:3] signal are disabled (i.e., the byte enable phase consists of continuous 0's). If the above two conditions are satisfied (i.e., a memory read/write signal, an effective memory address are sent, and Zlen is not suggested), the AND gate (106) will output a logic high signal via the second ADS by reference to the HCLK, therefore a valid memory cycle is actuated to drive the associated memory access operations. Obviously, such a memory access operation cannot begin until the signal contents in Phase II of both the HREQ[4:0] and HA[31:3] signals are analyzed.

FIG. 2 schematically shows a waveform diagram illustrative of a conventional control chip (10) performing a memory access operation, wherein a Pentium 4 CPU having HCLK and DCLK with operating frequencies under 100 and 133 MHz, respectively. Detailed operations of the conventional control chip are described hereinafter according to FIG. 2.

CPU (12) enables a memory cycle when CPU (12) intends to access data from the memory. Whether the memory cycle is valid depends on whether the aforementioned Zlen signal is embedded in Phase II of the HREQ[4:0] and HA[31:3] signals. The microprocessor interface (102) receives a logic low signal via the first ADS signal line when the CPU (12) wants to start a memory cycle, and both the HREQ[4:0] and HA [31:3] that refer to the HCLK are sent by the CPU (12) after a rising edge of the HCLK. Afterwards, the first ADS signal, HREQ[4:0] and HA[31:3] signals are decoded by the decoding circuit (104) in the microprocessor interface (102). The second ADS signal (logic high) that refers to the HCLK is generated via the AND gate (106), as shown in the rising edge (202) of FIG. 2, if the following conditions are met. First, the request selection phase (HREQ_A) in the HREQ [4:0] signal is either a memory read signal or a memory write signal and the address phase (HA_A) in the HA[31:3] signal indicates a valid memory range. Second, the Zlen signal is not recommended in the length phase (HREQ_B) and the byte enable phase (HA_B). That is, the specific condition that the memory length selected by the length phase (HREQ_B) in the HREQ[4:0] signal is "quad word" and simultaneously all bytes of the byte enable phase (HA_B) in the HA[31:3] signal are disabled (i.e. all at logic low or (at 0)) is not suggested. Thereafter, the second ADS signal enables the third ADS signal to be logic high after the rising edge (204) of the DCLK waveform by using the signal conversion circuit (108), wherein the logic high state associated with the third ADS signal is indicated by a rising edge (206), as shown in FIG. 2. The logic high third ADS signal is fed into the memory controller (110) to generate a relative memory control signal that refers to the DCLK and meets the memory specifications, as shown in the rising edge (208), and this control signal is subsequently sent to the memory for activating the associated operation. Notably, the related memory access operation can be processed after the second ADS signal is raised to logic high and maintained for a predetermined period of time. On the other hand, both the HREQ[4:0] and HA[31:3] signals continue in floating states after the first ADS signal is raised from logic low to high, while the current states of the first ADS signal, the HREQ [4:0] and the HA[31:3] signals are frozen until the CPU enables another memory cycle.

Since the control chip (10) does not enable the second ADS signal until an indication that a Zlen signal is detected. The second ADS signal cannot be generated until the Zlen signal has been determined to be absent from Phase II of HREQ[4:0] and HA[31:3]. Moreover, the performance and efficiency of CPU memory data access capabilities are affected by the significant signal delays caused by the signal conversion circuit (108). This implies that when the third ADS signal and the memory control signal appear will be lengthened.

SUMMARY OF INVENTION

Accordingly, the present invention provides a control chip for accelerating memory access operations and a method of operating the same. The second ADS signal can be generated one cycle advanced as long as the request selection phase (HREQ_A) indicates a memory read signal or a memory write signal, and the address phase (HA_A) indicates an effective memory range. Therefore, the third ADS signal and the memory control signal can be issued earlier than that found in the prior art and memory access operations will be accelerated.

To achieve the objective mentioned above, the present invention provides a control chip coupled to the CPU for accelerating memory accesses and a method of operating the same. In one form of the preferred embodiment, the control chip first receives a first strobe signal, a request signal and an address bus signal sent from the CPU and referring to the CPU clock. The request signal encompasses a request selection phase and a length phase, and the address bus signal contains an address phase and a byte enable phase. Thereafter, the second strobe signal that refers to the CPU clock is issued immediately if the selection phase indicates that the request signal is either a memory read or a memory write request signal and the address phase indicates to an effective memory address range. Then, the second strobe signal is converted to the third strobe signal that refers to the memory clocks. On the other hand, an enable signal referring to the CPU clock is issued if no Zlen signal is detected, i.e., the specific condition that the memory length indicated by the length phase is "quad word" and simultaneously all bytes of the byte enable phase are disabled is not suggested in the length phase and byte enable phase. When both the third strobe signal and the enable signal are enabled, the memory control signal referring to the memory clocks will be generated to actuate memory access operations.

The control chip for accelerating the memory access disclosed by the present invention includes a microprocessor interface, a signal conversion circuit, and a memory interface. The microprocessor interface is used to receive a first strobe a request signal and an address bus signal that are all sent from the CPU and refer to CPU clocks. The microprocessor interface issues the second strobe signal referring to the CPU clocks immediately after the request signal in the selection phase has determined a memory read request or a memory write request signal, and the address phase indicates an effective memory being accessed. Then, the microprocessor interface generates the enable signal that refers to the CPU clocks if no Zlen signal has been detected. The signal conversion circuit coupled to the microprocessor interface is used to convert the second strobe signal into a third strobe signal, wherein the second and third strobe signals refer the CPU and memory clocks, respectively. The memory controller coupled to the signal conversion circuit then issues a memory control signal by referring to the memory clocks when both the third strobe signal and the enable signal are enabled.

The second ADS signal in the embodiment will advance one cycle than the prior art because the second ADS signal is generated as long as the request selection phase is either a memory read or memory write signal and the address phase indicates an effective memory address. Therefore the third ADS signal and the memory control signal can arrive early, which significantly upgrades memory access performances.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DETAILED DESCRIPTION

Figure 1:
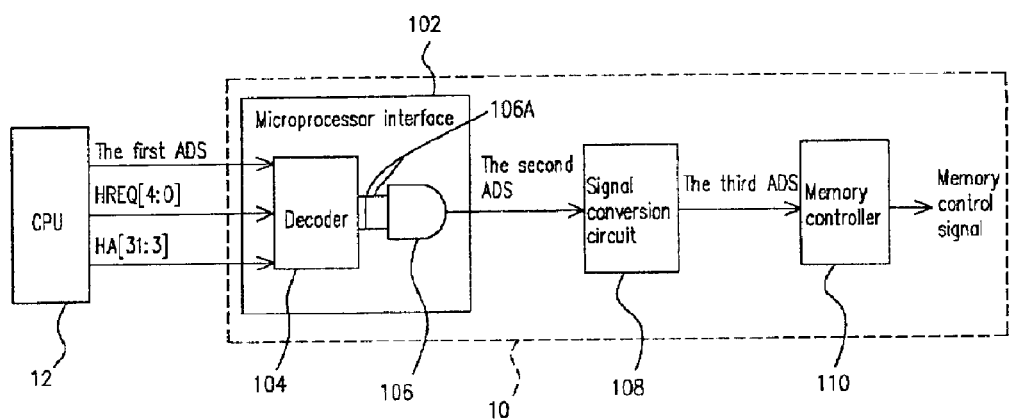
FIG. 1 shows a block diagram of the conventional control chip.
Figure 2:
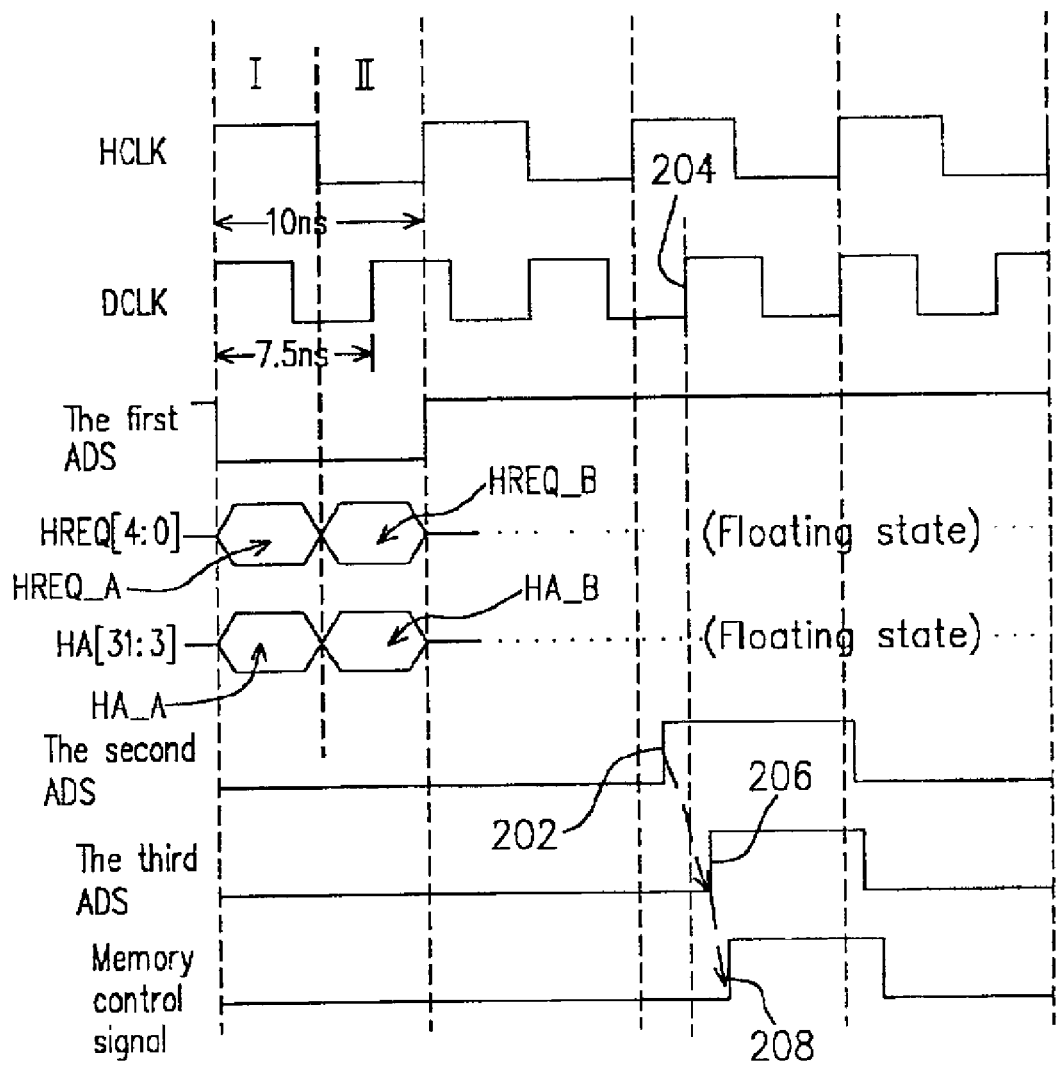
FIG. 2 shows a waveform diagram of the control chip in FIG. 1.
Figure 3:
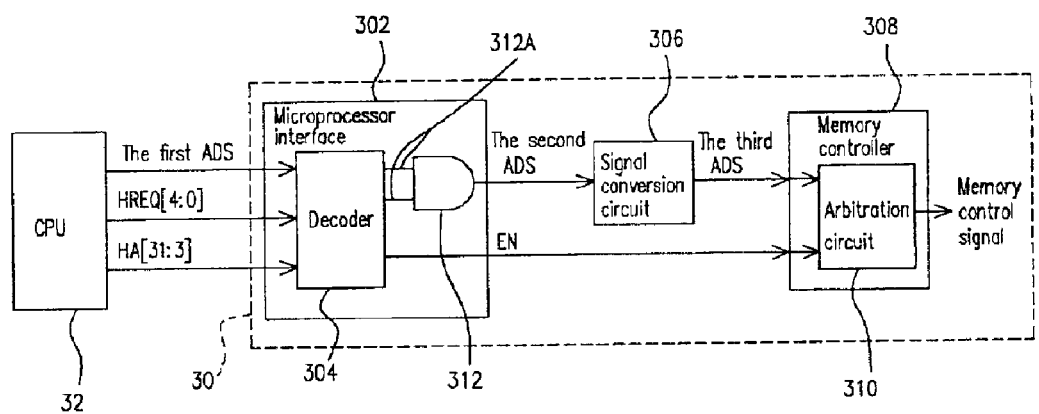
FIG. 3 shows a block diagram of the control chip for accelerating the memory access disclosed in the preferred embodiment of the present invention.

FIG. 3 shows a block diagram of the control chip (30) according to the present invention. The control chip (30) can be mounted on the motherboard to work as an interface component between the motherboard and the CPU (32). The control chip (30) contains a microprocessor interface (302), a signal conversion circuit (306) and a memory controller (308), wherein the microprocessor interface (302) further includes a decoder (304) and an AND gate (312) and the memory controller (308) encompasses an arbitration circuit (310). Operations associated with the control chip (30) for controlling memory accessing are described hereinafter.

The microprocessor interface (302) of the control chip (30) receives a first Address strobe (ADS) signal, a request signal (HREQ[4:0]), and an address bus signal (HA[31:3]) from the CPU (32). The HREQ[4:0]) includes two phases, Phase I and Phase II, which are respectively called "selection phase" and "length phase". The selection phase is used to determine the transmission type of the RREQ[4:0] signal while the length phase is used to indicate the length of memory being accessed. The address bus signal (HA[31:3] signal) contains two phases Phase I and Phase II, which are respectively called "address phase" and "byte enable phase". The address phase specifies a memory address, while the byte enable phase indicates the data type used for memory accessing, for example, a byte, a word, double word or quad word. The decoder (304) in the microprocessor interface (302) performs the decoding operations onto the first address strobe (ADS) signal, the request signal (HREQ[4:0]), and the address bus signal (HA[31:3]), while the decoding results are subsequently fed into the AND gate (312) through the signal line (312A). The AND gate (312) outputs a high logic state via the second ADS signal referring to the HCLK if the decoding results indicate the request selection phase is either a memory read or memory write signal, and the address phase is also addressed to an effective memory range. In the preferred embodiment, the decoder (304) outputs a logic high state via the EN signal line by referring to the HCLK if there is no Zlen signal suggested. That is, the specific condition that the memory length indicated by the length phase of the HREQ[4:0] signal is "quad word", and simultaneously all bytes of the byte enable phase in the HA[31:3] signal are disabled (e.g., all bytes are logic low) is detected in Phase II of HREQ[4:0] and HA[31:3]. The signal conversion circuit (306) coupled to the microprocessor interface (302) is used to convert the second ADS signal into a third ADS signal, wherein the second and third ADS signals refer to the HCLK and DCLK, respectively. Moreover, an arbitration circuit (310) mounted in the memory controller (308) receives the third ADS signal end the enable signal EN. When both the third ADS signal and the enable signal EN are enabled (i.e., both in logic high states), the arbitration circuit (310) outputs a memory control signal, which is then directed to the memory to actuate the required memory access operations. Notably, the arbitration circuit (310) can be established by using an AND gate or other logic circuits, while the AND gate (312) can also be mounted inside the decoder, or established by means of another logic circuit. It will be apparent to one of ordinary skill in the art that modifications within the spirit of the embodiment should be included in the appended claims.

Figure 4:
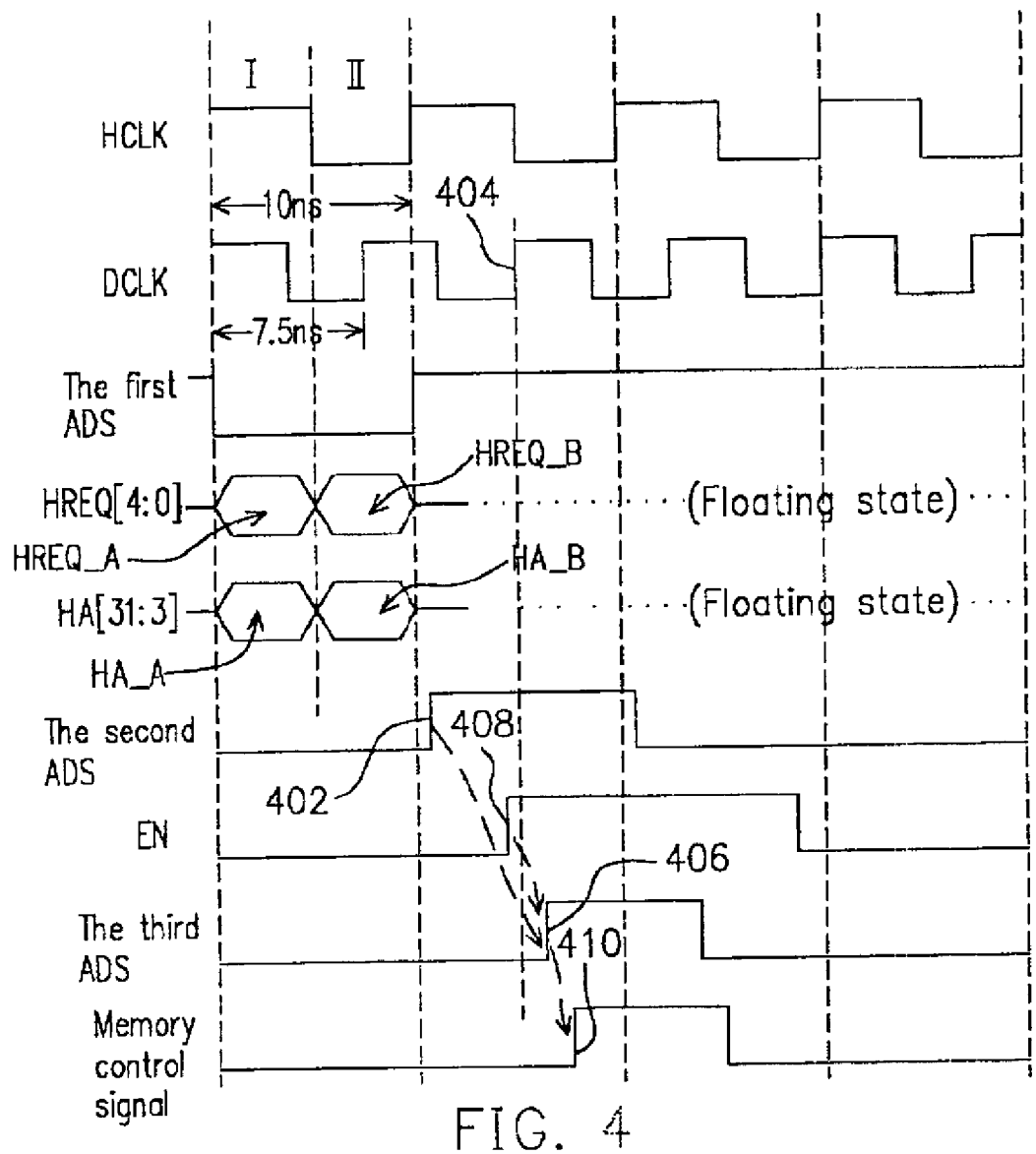
FIG. 4 shows a waveform diagram of the control chip in FIG. 3.

FIG. 4 shows a waveform diagram illustrative of the memory access operations of the control chip (30) according to the preferred embodiment. In the embodiment, HCLK and DCLK are clocks respectively operating under 100 and 133 MHz, while an Intel Pentium 4 is used as the CPU (32) in the present embodiment for exemplary purposes. Additionally, a north bridge control chip adapted to the Pentium 4 CPU is also employed in the embodiment. Operations in FIG. 4 are described hereinafter.

When the CPU (32) has to access data from memory it enables a memory cycle (of course, whether this memory cycle is valid still depends on the presence to the Zlen signal). Similarly, after the rising edge of the HCLK waveform, the control chip (30) receives the logic low state via the first ADS signal, the HREQ[4:0], and the HA[31:3] are all sent from the CPU (32) and refer to the HCLK. When the request selection phase (HREQ_A) in the HREQ[4:0] signal determines the HREQ[4:0] to be a memory read or memory write request signal and the address phase indicates an effective memory address being accessed, the AND gate (312) in the microprocessor interface (302) drives a logic high state in the second ADS signal after the rising edge of the HCLK waveform (as shown by a label 402). The decoding circuit (304) in the microprocessor interface (302) derives a logic high state in the EN signal by referring the HCLK (as shown by a label 408) when there is no Zlen signal detected. The second ADS signal converted into the third ADS signal having a logic high state (as shown by a label 406) by referring to the DCLK after the rising edge of DCLK waveform (404) by means of the signal conversion circuit (306). Afterwards, if both the third ADS signal and EN signal are enabled, the arbitration circuit (310) issues a memory control signal referring to the DCLK and meeting with the memory specification (as shown by a label 410). The memory control signal is finally sent to the memory to actuate the associated memory access operations. Additionally, although conversions in the signal conversion circuit 306 still requires a long time for operations, the system performance of the embodiment can be significantly upgraded because the second ADS are promptly issued after the HREQ_A and HA_A being decoded.

Notably, two of the second ADS signals cannot be issued in two continuous HCLK cycles so that the second ADS signal can be maintained for a certain interval for circuit operations. Since the current bus specification employs logic low states on the first ADS signal line for notifying a valid memory access demand, a logic high state should be kept for a certain interval between two adjacent first ADS signals for distinguishing purpose. Obviously, a continuous logic low state will not be used to indicate more than one first ADS signal because a logic low state can only indicate an active first ADS signal, which also implies that no two continuous second ADS signals occur in the embodiment. Moreover, the enable signal EN should be maintained at a logic high state until the third ADS signal is also at a logic high state. Therefore both logic high states of the third ADS signal and enable signal EN can be recognized by the arbitration circuit (310) simultaneously. For example, when the third ADS signal is at a high logic state at the rising edge (406), the EN signal maintained at a logic high state (408) can also be detected by the arbitration circuit (310). The required memory control signal (410) can also be further generated. In the preferred embodiment (i.e. the frequency of the HCLK and DCLK operate under 100 and 133 MHz respectively), the EN should maintain an interval of at least 3/2 (i.e., 1.5) times the HCLK period to assure that the enable signal EN will kept at a logic high state until the end of the third ADS signal (i.e., the third ADS signal is at a logic low state).

The microprocessor interface (302) promptly issues the second ADS signal as long as the selection phase is either a memory read or a write signal and the address phase indicates an effective memory address. The second ADS signal is subsequently sent to the signal conversion circuit (108) for being converted to have operating frequency adapted to memory access operations. Therefore, the second ADS signal can be issued one cycle advanced. Moreover, since the enable signal EN is issued if the Zlen signal has not been detected, the required memory control signal can be driven when the enable signal EN is issued and sent to the arbitration circuit (310), and then waits for the coming of the third ADS signal. Obviously, since the second ADS signal is converted into the third ADS signal one cycle advanced, delays of the control chips are significantly decreased in comparison to the conventional approach. Memory access operations can thus be accelerated and the system performance and efficiency can be further enhanced. On the other hand, the associated memory cycle will be cancelled if the Zlen signal is detected since the enable signal EN is maintained in a logic low state (i.e. it is disabled).

In conclusion, the present invention has the following advantages:

1. The second ADS signal will be issued one cycle advanced than the conventional approach since the microprocessor interface can generate the second ADS signal as long as the selection phase is a memory read or memory write signal and the address phase indicates an effective memory address.

2. The third ADS signal will be issued earlier than that found in the prior art since the second ADS signal can be issued one cycle advanced, memory access performance can be upgraded according to the invention.

Although the invention has been described with reference to a particular embodiment thereof, it will be apparent to one of ordinary skill in the art that modifications to the described embodiment may be made without departing from the spirit of the invention. Accordingly, the scope of the invention will be defined by the attached claims rather than by the above detailed description.

What is claimed is:

1. An operation method of a control chip for accelerating a memory access operation, wherein the control chip is coupled to a Central Processing Unit (CPU), the operation method comprising:
   receiving from the CPU a first address strobe signal, a request signal, and an address bus signal that refer to a first clock, wherein the request signal comprises a selection phase and a length phase, and the address bus signal comprises an address phase and a byte enable phase;
   issuing a second address strobe signal that refers to the first clock when the selection phase indicates either a memory read request signal or a memory write request signal and the address phase indicates an effective memory address;
   converting the second address strobe signal that refers to the first clock to a third address strobe signal that refers to a second clock;
   issuing an enable signal that refers to the first clock when a specific condition indicative of an invalidate memory cycle is not suggested; and
   issuing a memory control signal that refers to the second clock when both the third address strobe signal and the enable signal are enabled.

2. The operation method of claim 1, wherein the first address strobe signal is issued when the CPU initializes a memory cycle.

3. The operation method of claim 1, wherein the first clock is a CPU clock and the second clock is a memory clock.

4. The operation method of claim 1, wherein the selection phase is used to define a transmission type of the request signal and the length phase is used to define a memory length that is accessed by the request signal.

5. The operation method of claim 1, wherein the address phase is used to define an address of a memory location and the byte enable phase is used to select a byte data, a word data, a double word data, or a quad word data for the memory access operation.

6. The operation method of claim 1, wherein the specific condition indicates that a memory length indicated by the length phase is a specific data type in the length phase and simultaneously all bytes of the byte enable phase are disabled in the byte enable phase.

7. The operation method of claim 6, wherein the specific data type is a quad word data format.

8. The operation method of claim 1, wherein the control chip comprises, a microprocessor interface for receiving the first address strobe signal, the request signal, and the address bus signal to generate the second address strobe signal and the enable signal.

9. The operation method of claim 8, wherein two adjacent second address strobe signals are not continuously issued by the microprocessor interface in two continuous cycles of the first clock.

10. The operation method of claim 1, wherein the control chip comprises a signal conversion circuit for converting the second address strobe signal that refers to the first clock into the third address strobe signal that refers to the second clock.

11. The operation method of claim 1, wherein the control chip comprises a memory interface, a control signal referring to the second clock is issued for controlling the memory access operation when both the third address strobe signal and the enable signal are enabled.

12. An operation method of a control chip for accelerating a memory access operation, where the control chip is coupled to a Central Processing Unit (CPU), the operation method comprising:
   receiving from the CPU a first address strobe signal, a request signal, and an address bus signal that refer to a CPU clock, wherein the request signal comprises a selection phase and a length phase and the address bus signal comprises an address phase and a byte enable phase;
   issuing a second address strobe signal that refers to the CPU clock when the selection phase indicates either a memory read request signal or a memory write request signal and the address phase indicates an effective memory address;
   issuing an enable signal that refers to the CPU clock when a zero-length signal is not suggested, wherein the zero-length signal indicates that a memory length indicated lay the length phase follows a quad word data format and simultaneously all bytes of the byte enable phase are disabled;
   converting the second address strobe signal that refers to the CPU clock to a third address strobe signal that refers to a memory clock; and
   generating a memory control signal that refers to the memory clock when both the third address strobe signal and the enable signal are enabled, wherein the memory control signal is not issued when the enable signal is disabled due to the zero-length signal being suggested.

13. The operation method of claim 12, wherein the request selection phase is used to define a transmission type of the request signal and the length phase is used to define a memory length that is accessed by the request signal.

14. The operation method of claim 12, wherein the address phase is used to define an address of a memory location and the byte enable phase is used to select a byte data, a word data, a double word data, or a quad word data for the memory access operation.

15. The operation method of claim 12, wherein the control chip comprises:
   a microprocessor interface for receiving the first address strobe signal, the request signal, and the address bus signal to generate the second address strobe signal and the enable signal;
   a signal conversion circuit for converting the second address strobe signal that refers to the CPU clock into the third address strobe signal that refers to the memory clock; and a memory interface for issuing a control signal referring to the memory clock and used for controlling the memory access operation when both the third address strobe signal and the enable signal are enabled.

16. The operation method of claim 15, wherein two adjacent second address strobe signals are not continuously issued by the microprocessor interface in two continuous cycles of the first clock.

17. A control chip for accelerating a memory access operation, coupled to a Central Processing Unit (CPU), the control chip comprising:

a processor interface for receiving a first address strobe signal, a request signal, and an address bus signal from the CPU that refers to a CPU clock, wherein the request signal comprises a selection phase and a length phase and the address bus signal comprises an address phase and a byte enable phase, wherein when the selection phase indicates either a memory read request signal or a memory write request signal and the address phase indicates an effective address range of the memory, the processor interface issues a second address strobe signal that refers to the CPU clock, wherein the processor interface issues an enable signal that refers to the CPU clock when a specific condition indicative of an invalidate memory cycle is not suggested in the length phase and the byte enable phase;

a signal conversion circuit, coupled to the microprocessor interface for converting the second address strobe signal that refers to the CPU clock to a third address strobe signal that refers to a memory clock; and a memory controller, coupled to the signal conversion circuit for generating a memory control signal when both the third strobe signal and the enable signal are enabled, wherein the memory control signal is generated by referring to the memory clock.

18. The control chip of claim 17, wherein the processor interface comprises a decoding circuit for decoding the first strobe signal, the request signal, and time address bus signal, and output the second strobe signal and the enable signal.

19. The control chip of claim 17, wherein the memory interface comprises an arbitration circuit for detecting whether both the third strobe signal and the enable signal are enabled or not.

20. The control chip of claim 17, wherein the specific condition indicates that a memory length indicated by the length phase is a quad word data format and simultaneously all bytes of the byte enable phase are disabled.

21. The control chip of claim 17, wherein two adjacent second address strobe signals are not continuously issued by the microprocessor interface in two continuous cycles of the first clock.

22. The control chip of claim 17, wherein the control chip is mounted on a motherboard.

* * * * *